United States Patent
Yamazaki

(10) Patent No.: US 8,301,373 B2
(45) Date of Patent: Oct. 30, 2012

(54) NAVIGATION DEVICE AND FACILITY IMAGE DISPLAY METHOD

(75) Inventor: Noboru Yamazaki, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 1199 days.

(21) Appl. No.: 11/941,413

(22) Filed: Nov. 16, 2007

(65) Prior Publication Data

US 2008/0125966 A1 May 29, 2008

(30) Foreign Application Priority Data

Nov. 27, 2006 (JP) ................................. 2006-318597

(51) Int. Cl.
G01C 21/00 (2006.01)

(52) U.S. Cl. .................. 701/438; 701/461; 340/995.1

(58) Field of Classification Search ............... 701/201, 701/207, 208, 209, 436, 438, 461, 462; 340/995.1; 345/2.2
See application file for complete search history.

(56) References Cited

U.S. PATENT DOCUMENTS

| | | | | |
|---|---|---|---|---|
| 6,983,203 B1* | 1/2006 | Wako | ............................ | 701/208 |
| 7,373,244 B2* | 5/2008 | Kreft | ............................. | 701/207 |
| 7,788,600 B2* | 8/2010 | Lau et al. | ....................... | 715/810 |
| 7,814,435 B2* | 10/2010 | Wako | ............................ | 715/835 |
| 7,818,116 B1* | 10/2010 | Nesbitt | .......................... | 701/201 |
| 7,818,124 B2* | 10/2010 | Herbst et al. | ................... | 701/211 |
| 7,913,179 B2* | 3/2011 | Sheha et al. | .................... | 715/769 |
| 7,941,269 B2* | 5/2011 | Laumeyer et al. | ............ | 701/209 |
| 2003/0023374 A1* | 1/2003 | Shimabara | ..................... | 701/212 |
| 2003/0201914 A1* | 10/2003 | Fujiwara et al. | .......... | 340/995.24 |
| 2004/0012506 A1* | 1/2004 | Fujiwara et al. | ............. | 340/995.1 |
| 2004/0204841 A1* | 10/2004 | Kawasaki | ....................... | 701/209 |
| 2004/0236507 A1* | 11/2004 | Maruyama et al. | ............ | 701/208 |
| 2005/0137788 A1* | 6/2005 | Kimura | .......................... | 701/201 |
| 2005/0143905 A1* | 6/2005 | Yoshikawa et al. | ............ | 701/200 |
| 2006/0217883 A1* | 9/2006 | Nomura | ......................... | 701/208 |
| 2008/0082262 A1* | 4/2008 | Silva et al. | ..................... | 701/211 |
| 2008/0238933 A1* | 10/2008 | Wako | ............................. | 345/617 |
| 2009/0088964 A1* | 4/2009 | Schaaf et al. | .................. | 701/200 |
| 2009/0100363 A1* | 4/2009 | Pegg et al. | ..................... | 715/765 |
| 2009/0144660 A1* | 6/2009 | Wako | ............................. | 715/835 |
| 2009/0150069 A1* | 6/2009 | Iao | ................................. | 701/207 |

FOREIGN PATENT DOCUMENTS

| | | |
|---|---|---|
| JP | 09-119839 | 5/1997 |
| JP | 2000-136937 | 5/2000 |
| JP | 2001-215124 | 8/2001 |
| JP | 2002-243479 | 8/2002 |
| JP | 2006-113047 | 4/2006 |

\* cited by examiner

Primary Examiner — Helal A Algahaim
(74) Attorney, Agent, or Firm — Brinks Hofer Gilson & Lione

(57) ABSTRACT

The invention provides a navigation device and a facility image display method, whereby a user can recognize various types of information about a facility from the image corresponding to the facility. The navigation device includes road information, etc., used for drawing map images; facility information including the nodes of the facilities and a plurality of attributes of the facilities; a buffer memory that stores data of icon images corresponding to each of the plurality of attributes of the facilities; a map drawing unit that draws a map image on the basis of the road information, etc., and draws any of the icon images corresponding to the plurality of attributes of the facilities contained in the facility information, at a position in the map image corresponding to the node identified in the facility information; and an image synthesizing unit that causes a display unit to display the drawn image.

11 Claims, 12 Drawing Sheets

FIG.2(a)

| FACILITY ID | CATEGORY | NODE | NAME | BRAND | ICON ID | TYPE OF FUEL | ICON ID | ... |
|---|---|---|---|---|---|---|---|---|

FIG.2(b)

| FACILITY ID | CATEGORY | NODE | NAME | BRAND | ICON ID | AVAILABLE DETAILED INFORMATION | ICON ID | ... |
|---|---|---|---|---|---|---|---|---|

FIG.3

FACILITY ICON INFORMATION

| ICON ID | ICON IMAGE DATA |
|---|---|

NAVIGATION DEVICE AND FACILITY IMAGE DISPLAY METHOD

RELATED APPLICATIONS

The present application claims priority to Japanese Patent Application Number 2006-318597, filed Nov. 27, 2006, the entirety of which is hereby incorporated by reference.

BACKGROUND OF THE INVENTION

1. Field of the Invention

The present invention relates to a navigation device mounted in a vehicle, for example, which performs route guidance, and a facility image display method.

2. Description of the Related Art

A navigation device displays a map image of the area around the position of a vehicle including the navigation device, during route guidance, for example, to a destination. In some cases, an icon image corresponding to a facility is superimposed on the map image at a predetermined position of the facility, such as a gas station or a restaurant. The icon image corresponding to the facility being displayed in this manner allows the driver to easily recognize which type of facility is located at a particular place (patent documents: JP-A No. 2006-113047, JP-A No. 2000-136937, JP-A No. 1997-119839, for example).

A conventional icon image corresponding to a facility limits the information about the facility that a user can recognize from the icon image. The icon image corresponding to a gas station, for example, may either correspond to a brand of the gas station or to types of fuel provided by the gas station. Accordingly, the user can only recognize the brand of the gas station from the icon image corresponding to the brand; and the user can only recognize the types of fuel provided by the gas station from the icon image corresponding to the types of fuel.

During route guidance, for example, since the user needs a landmark facility in making a right or left turn, the user wants to know the brand of the gas station. On the other hand, during a facility search, the user wants to know the types of fuel provided by the gas station rather than the brand. Thus, the relevant information about the facility changes depending on the situation. Accordingly, it is desirable that the user can recognize various types of information about a facility from the icon image corresponding to the facility.

SUMMARY OF THE INVENTION

The present invention has been made in view of the above circumstances, and provides a navigation device whereby the user can recognize various types of information about a facility from the icon image corresponding to the facility, and a facility image display method.

According to one aspect of the present invention, the navigation device includes a map drawing information storage means that stores map drawing information used for drawing a map image; a facility information storage means that stores facility information including positional information on facilities and a plurality of attributes of the facilities; a facility image storage means that stores facility images corresponding to each of the plurality of attributes of the facilities; a map drawing means that draws the map image based on the map drawing information and draws the facility images corresponding to the plurality of attributes of the facilities included in the facility information, at a position in the map image corresponding to the positional information included in the facility information; and a first display control means that causes a display means to display images drawn by the map drawing means.

According to this construction, a facility image corresponding to each of the plurality of attributes of the facilities is provided; the map image is drawn on the basis of the map drawing information; and the facility images corresponding to the attributes of the facilities included in the facility information can be appropriately drawn and displayed at a position in the map image corresponding to the positional information included in the facility information. In other words, various types of facility images corresponding to the plurality of attributes of the facilities can selectively be drawn on the map image to he superimposed thereon. Accordingly, the user can recognize various types of information about the corresponding facility from the various types of the facility images that can be displayed.

A navigation device according to the invention may include a first attribute selection means that selects any one of the plurality of attributes of the facilities included in the facility information stored in the facility information storage means, wherein the map drawing means draws a facility image corresponding to a facility attribute selected by the first attribute selection means, of the facility images stored in the facility image storage means.

In a navigation device according to the invention, the first attribute selection means may select any one of the plurality of attributes of the facilities in accordance with a user's operation of an operating unit in selecting the facility attribute. According to this construction, it is possible to display the facility image corresponding to the attribute that the user desires, and the user can recognize the desired information about the facility.

In a navigation device according to the invention, the facility may be a gas station, and the attribute may be a brand of the gas station and a type of fuel provided by the gas station.

In a navigation device according to the invention, the first attribute selection means may select the facility attribute in accordance with an operational state of the navigation device. According to this construction, an appropriate facility image can be drawn in accordance with an operational state of the navigation device during route guidance, for example.

A navigation device according to the invention may include a facility information search means that searches the facility information stored in the facility information storage means, in accordance with a user's operation of an operating unit in searching for a facility; a search result drawing means that draws a search result image including an image corresponding to the facility information acquired as a search result by the facility information search means, and one of the facility images corresponding to the plurality of attributes of the facilities included in the facility information acquired as the search result by the facility information search means; and a second display control means that causes the display means to display the search result image drawn by the search result drawing means. According to this construction, the facility images corresponding to the plurality of attributes of the facilities are selectively included in the resulting image of the search result; therefore, the user can recognize various types of information about the corresponding facility by the facility images.

A navigation device according to the invention may include a second attribute selection means that selects one of the plurality of attributes of the facilities included in the facility information acquired as the search result by the facility information search means, wherein the search result drawing means draws a facility image corresponding to a facility attribute selected by the second attribute selection means, of the facility images corresponding to the plurality of attributes of the facilities included in the facility information acquired as the search result by the facility information search means.

In a navigation device according to the invention, the second attribute selection means may select any one of the plurality of attributes of the facilities in accordance with a user's operation of an operating unit in selecting the facility attribute. According to this construction, it is possible to display a facility image corresponding to the attribute that the user desires and the user can recognize the desired information about the facility.

In a navigation device according to the invention, the facility may be a gas station, and the attribute may be a brand of the gas station and a type of fuel provided by the gas station.

A navigation device according to the invention may include a positional detection means that detects a position of the navigation device; and a distance calculation means that calculates a distance between a facility corresponding to the facility information acquired as the search result by the facility information search means and the navigation device, on the basis of positional information included in the facility information acquired as the search result by the facility information search means and a position of the navigation device detected by the positional detection means, wherein the search result drawing means draws an image in a manner that the facility information acquired as the search result by the facility information search means is arranged in the order of a shorter distance between the facility corresponding to the facility information and the navigation device. According to this construction, it becomes possible to preferentially display information on a nearby facility, that is, information on a facility having a greater possibility of being selected as a destination or the like.

In a navigation device according to the invention, the attribute of the facility may be any of names of facilities, types of goods or services provided by the facilities, and information indicating that the navigation device can provide information about the facilities.

According to another aspect of the invention, the facility image display method includes a map drawing step that draws a map image based on map drawing information stored in a storage means, and draws facility images corresponding to a plurality of attributes of facilities included in facility information, at a position in the map image corresponding to positional information included in the facility information stored in the storage means; and a first display control step that causes a display means to display images drawn by the map drawing step.

A facility image display method according to the invention may include a facility information search step that searches the facility information stored in the storage means in accordance with a user's operation of an operating unit in searching for a facility; a search result drawing step that draws a search result image including an image corresponding to the facility information acquired as a search result by the facility information search step, and the facility images corresponding to the plurality of attributes of the facilities included in the facility information acquired as the search result by the facility information search step; and a second display control step that causes the display means to display the search result image drawn by the search result drawing step.

According to the present invention, since various types of facility images corresponding to the plurality of attributes of the facilities can selectively be drawn on the map image to be superimposed thereon, the user can recognize various types of information about the corresponding facility from various types of the facility images that can be displayed.

BRIEF DESCRIPTION OF THE DRAWINGS

FIG. 2 is a chart illustrating an example of facility information;

FIG. 3 is a chart illustrating an example of facility icon information;

DESCRIPTION OF THE PREFERRED EMBODIMENTS

Figure 1:
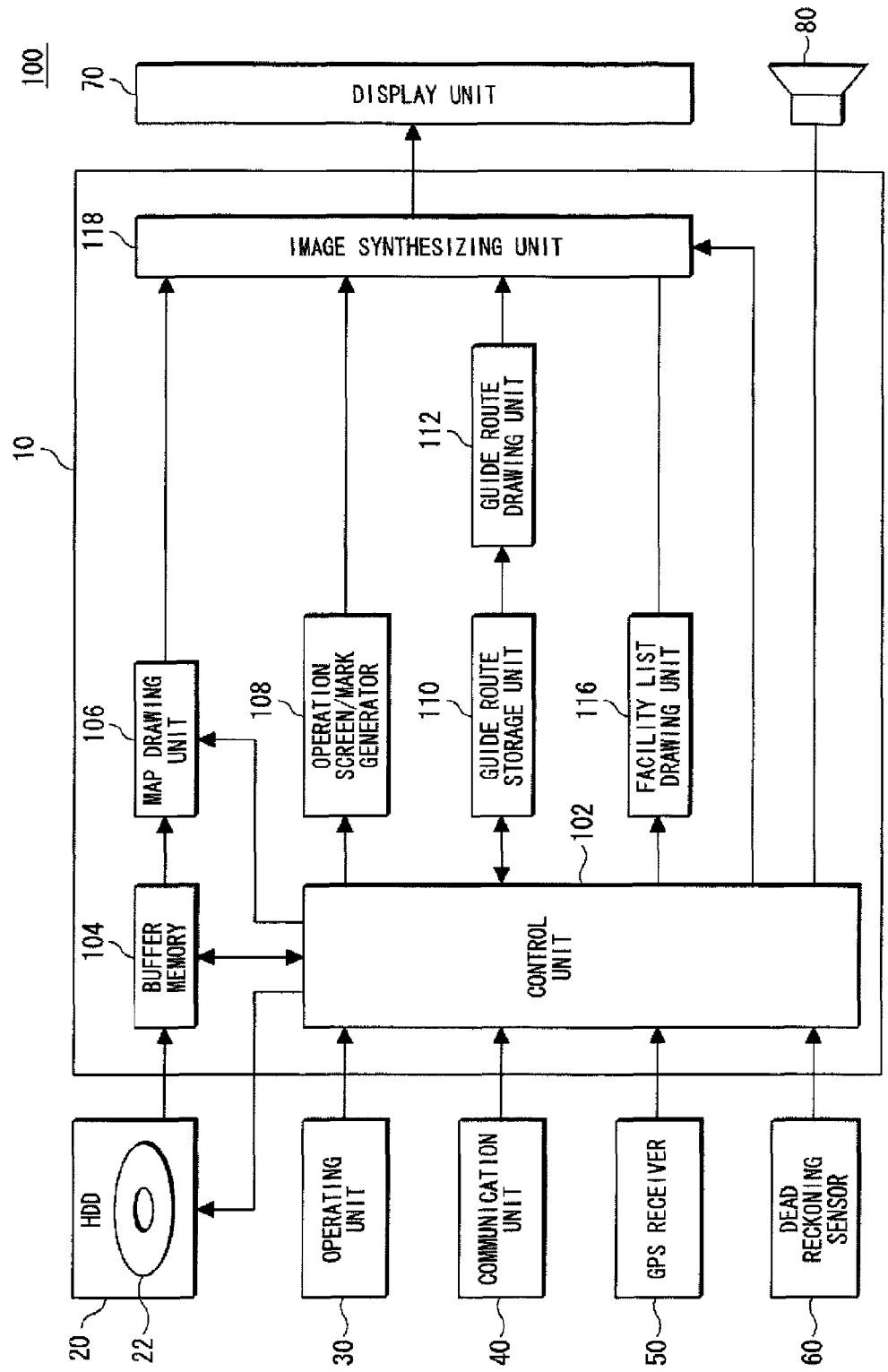
FIG. 1 illustrates the general construction of a navigation device.

Embodiments of the present invention will be described in detail with reference to the appended drawings. FIG. 1 illustrates the construction of a navigation device in which one aspect of the present invention is embodied. A navigation device 100 illustrated in FIG. 1 includes a frame body 10, hard disk drive (HDD) 20, operating unit 30, communication unit 40, GPS receiver 50, dead reckoning sensor 60, display unit 70, and speaker 80, which are mounted in a vehicle.

The HDD 20 is equipped with a hard disk 22. Map data are stored in the hard disk 22. The HDD 20 appropriately reads out the map data stored in the hard disk 22. The map data include road information, used for drawing map images, formed of a set of a plurality of positions (nodes) specified by latitude and longitude. The map data also include information on facilities (facility information), and information on icon images of the facilities (facility icon information) corresponding to the attributes of the facilities, which are used for displaying the facilities on the map images.

FIG. 2 illustrates one example of the facility information contained in the map data. The facility information in FIG. 2(a), showing a case where the facility is a gas station, includes an ID that uniquely specifies the facility, a category indicating that the facility is a gas station, a position (node) specified by the latitude and longitude of the gas station, a name of the gas station, a brand of the gas station as attribute information, an ID (icon ID) of the facility icon information corresponding to the brand used for displaying the gas station on a map image, which is associated with the brand, a type of fuel provided by the gas station as attribute information, and an ID (icon ID) of the facility icon information corresponding to the type of fuel used for displaying the gas station on the map image, which is associated with the type of fuel. In case there are plural types of fuel provided by the gas station, the facility information includes a plurality of types of fuel and IDs that are associated with the types of fuel.

On the other hand, the facility information in FIG. 2(b), showing a case where the facility is a restaurant, includes an ID that uniquely specifies the facility, a category indicating that the facility is a restaurant, a position (node) of the restaurant, a name of the restaurant, a brand of the restaurant as attribute information, an ID (icon ID) of the facility icon information corresponding to the brand used for displaying the restaurant on the map image, which is associated with the brand, information (available detailed information) indicating the possibility of providing detailed information about the evaluation of the restaurant and so forth as attribute information, and an ID (icon ID) of the facility icon information corresponding to the possibility of providing the detailed information used for displaying the restaurant on the map image, which is associated with the available detailed information. If there is no available detailed information for the restaurant, the facility information does not include the available detailed information and the icon ID associated with the available detailed information.

FIG. 3 illustrates one example of the facility icon information. The facility icon information in FIG. 3 includes an icon ID and icon image data for a facility. Both the facility information in FIG. 2 and the facility icon information in FIG. 3 include the icon ID, so that the facility corresponding to the facility information is associated with the icon image corresponding to the facility.

The operating unit 30 has operation buttons, a joy stick, and the like. The user operates the operating unit 30 in setting a destination when searching for a guide route, in setting search information such as the name of a facility or the category when searching for the facility, and in selecting an attribute corresponding to an icon image when selecting the icon image corresponding to the facility, and so forth. The communication unit 40 is a portable phone, for example, which communicates with the outside in order to acquire various types of information for the navigation device 100. The GPS receiver 50 receives a GPS signal from a GPS satellite, for detecting a position of a vehicle. The dead reckoning sensor 60 uses a gyroscope for detecting a travel direction of a vehicle, and a distance sensor that generates pulses (speed pulses) at each constant travel distance.

The frame body 10 includes a control unit 102, a buffer memory 104, a map drawing unit 106, an operation screen/mark generator 108, a guide route storage unit 110, a guide route drawing unit 112, a facility list drawing unit 116, and an image synthesizing unit 118.

In this embodiment, the buffer memory 104 corresponds to the map drawing information storage means, the facility information storage means, and the facility image storage means. The map drawing unit 106 corresponds to the map drawing means. The image synthesizing unit 118 corresponds to the first and second display control means. The display unit 70 corresponds to the display means. The control unit 102 corresponds to the first and second attribute selection means, the facility information search means, and the positional detection means and distance calculation means. The facility list drawing unit 116 corresponds to the search result drawing means.

The control unit 102 controls the operation of the navigation device 100. In particular, the control unit 102 calculates the position of a vehicle, namely, the position of the navigation device 100, and the azimuth and speed of the vehicle, on the basis of the GPS signal received by the GPS receiver 50, the travel direction of the vehicle detected by the dead reckoning sensor 60, and the output interval of the speed pulses.

The control unit 102 instructs the HDD 20 to read the map data stored in the hard disk 22. As an example, the control unit 102 instructs the HDD 20 to read the map data including: the road information and facility information corresponding to a predetermined range around the vehicle position, and the facility icon information. The map data read by the HDD 20 are stored in the buffer memory 104. The map drawing unit 106 draws a map image on which the icon image corresponding to the facility is superimposed, on the basis of the road information and facility information contained in the map data stored in the buffer memory 104 and the icon image data in the facility icon information. The drawing of the map image on which the icon image corresponding to the facility is superimposed will be described in more detail later.

The control unit 102 instructs the operation screen/mark generator 108 to draw an image in accordance with the user's operation of the operating unit 30 and the operation state of the navigation device 100. The operation screen/mark generator 108, responding to this instruction, draws various types of menu screens, and images of a vehicle position mark a cursor mark and so forth.

The control unit 102 reads the map data stored in the buffer memory 104 in accordance with the user's operation of the operating unit 30 for searching for a guide route, and calculates a guide route to the destination by using a predetermined route search algorithm on the basis of the relevant map data. The information about the calculated guide route (a set of a plurality of nodes corresponding to the guide route from the start point to the destination, for example) is stored in the guide route storage unit 110. The guide route drawing unit 112 draws a guide route image on the basis of the guide route information stored in the guide route storage unit 110.

The control unit 102 reads the facility information in the map data stored in the buffer memory 104 in accordance with the user's operation of the operating unit 30 for searching for a facility, and searches for the facility on the basis of the relevant facility information. The searching for the facility will be described in more detail later. Further, the control unit 102 provides the facility information corresponding to the searched facility to the facility list drawing unit 116. The facility list drawing unit 116 draws an image of a list of the facility information as a search result image, on the basis of the received facility information.

The control unit 102 instructs the image synthesizing unit 118 to synthesize an image, in accordance with the user's operation of the operating unit 30 and the operation state of the navigation device 100. The image synthesizing unit 118, responding to this instruction, appropriately synthesizes various types of images drawn by the map drawing unit 106, the operation screen/mark generator 108, the guide route drawing unit 112, and the facility list drawing unit 116, and causes the display unit 70 to display the synthesized image. Further, the control unit 102 generates a voice output in accordance with the user's operation of the operating unit 30 and the operation state of the navigation device 100, and causes the speaker 80 to produce the voice output. In particular, during route guidance the control unit 102 generates a guide voice instructing a turn at the next intersection, for example, on the basis of the guide route information, and causes the speaker 80 to produce this output.

Figure 4:
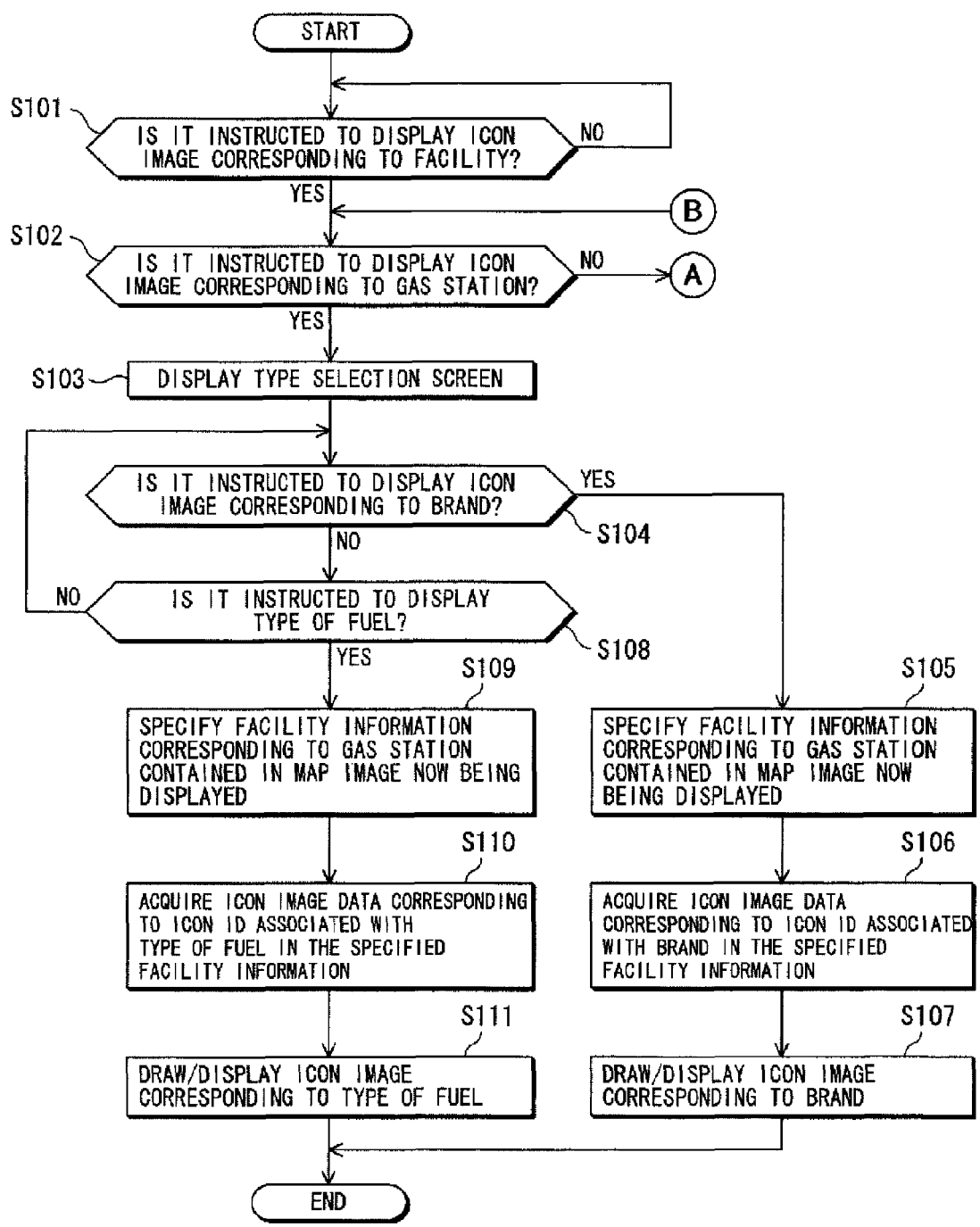
FIG. 4 is a first flow chart illustrating the operation of drawing a map image on which a facility icon image is superimposed.
Figure 5:
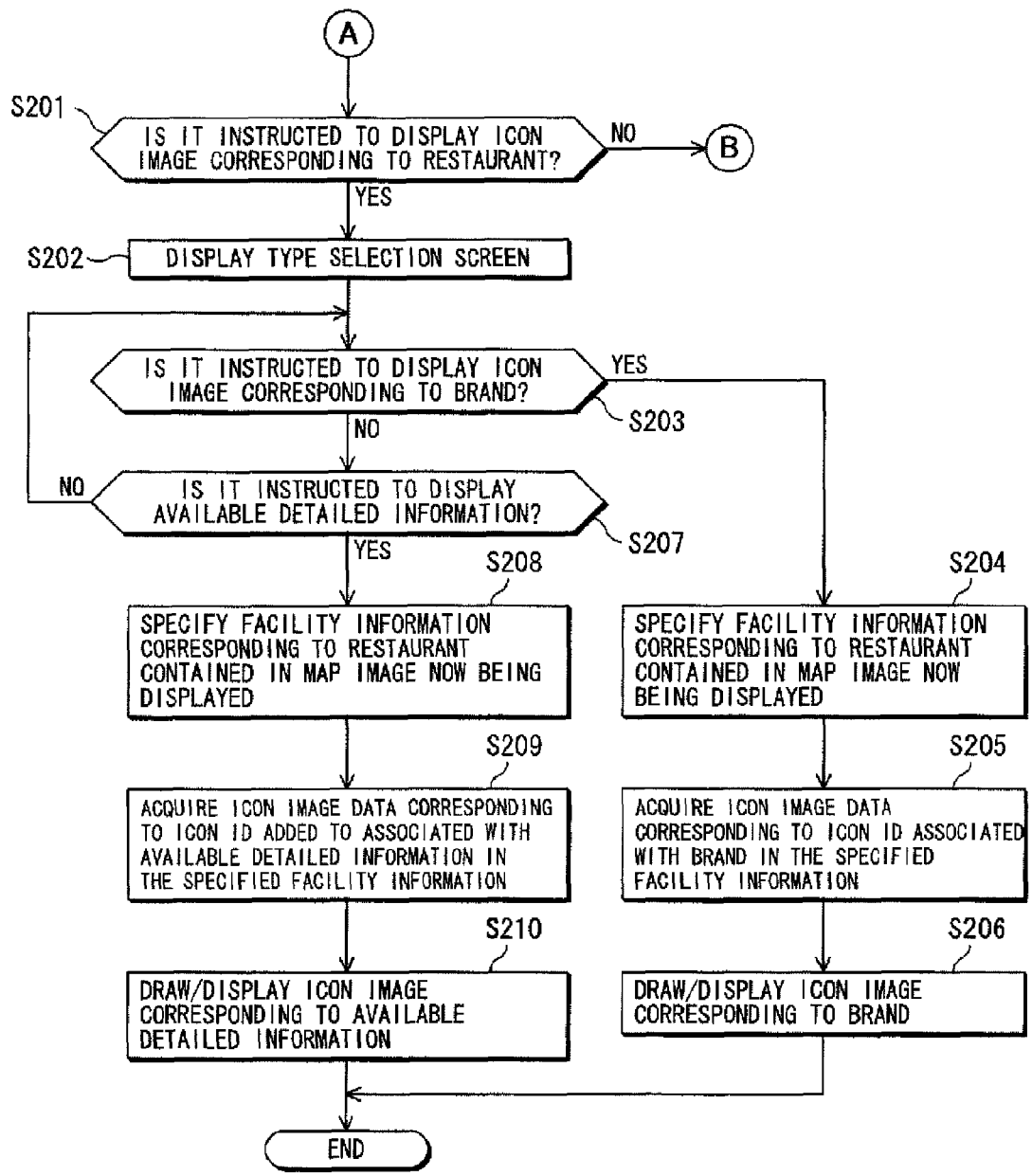
FIG. 5 is a second flow chart illustrating the operation of drawing a map image on which a facility icon image is superimposed.

Next, the drawing of a map image on which an icon image corresponding to a facility is superimposed in the navigation device 100 will be described in detail. FIG. 4 and FIG. 5 are a flow chart illustrating the operation of drawing the map image on which the icon image corresponding to the facility is superimposed.

The control unit 102 determines whether the user has operated the operating unit 30 and instructed the display of an icon image corresponding to a facility (S101). Specifically, the control unit 102 instructs the HID 20 to read the map data including the road information and facility information corresponding to a predetermined range around the vehicle position, and the facility icon information. The map data that the HDD 20 has read in response to this instruction are stored in the buffer memory 104. The map drawing unit 106 draws a map image of the area around the vehicle position, on the basis of the road information and so forth contained in the map data stored in the buffer memory 104. Further, the control unit 102 instructs the operation screen/mark generator 108 to draw a vehicle position mark and a menu screen whereby the user may instruct the display of the icon image corresponding to a facility. The operation screen/mark generator 108, responding to this instruction, draws the vehicle position mark and the menu screen. The image synthesizing unit 118 synthesizes the map image around the vehicle position drawn by the map drawing unit 106 and the vehicle position mark and menu screen drawn by the operation screen/mark generator 108, and causes the display unit 70 to display the synthesized image.

Figure 6:
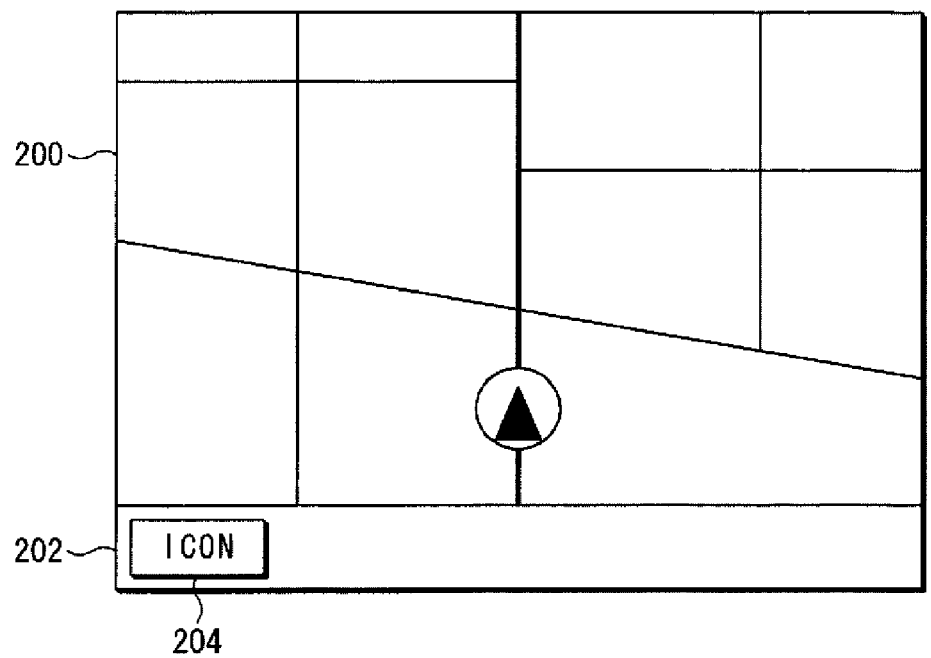
FIG. 6 illustrates a first example of the synthesized image of a map image and a menu screen.

FIG. 6 illustrates one example of the display image in the above case, which includes a map image 200 and a menu screen 202 having an operation button 204 whereby the user may instruct the display of the icon image corresponding to the facility. In FIG. 6, as the user operates the operating unit 30, places the cursor on the operation button 204, and selects the operation button, the control unit 102 determines that it has been instructed to display the icon image corresponding to the facility.

Figure 7:
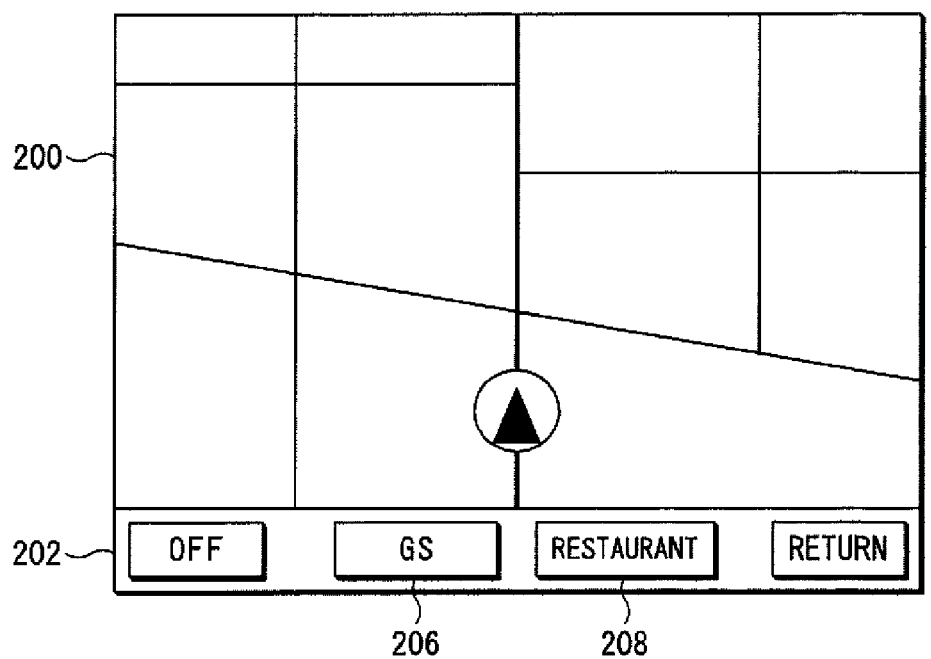
FIG. 7 illustrates a second example of the synthesized image of the map image and the menu screen.

If it is instructed to display the icon image corresponding to the facility, the control unit 102 further determines whether it is instructed to display an icon image corresponding to a gas station (S102). Specifically, in FIG. 6, as the operation button 204 is selected, the control unit 102 instructs the operation screen/mark generator 108 to draw a menu screen whereby the user may select a facility for which the user wants to display an icon image. In response to this instruction, the operation screen/mark generator 108 draws the menu screen. The image synthesizing unit 118 synthesizes this new menu screen and the map image around the vehicle position, and causes the display unit 70 to display the synthesized image. FIG. 7 illustrates one example of the display image in the above case; in comparison to FIG. 6, the menu screen 202 is switched. The menu screen 202 after being switched includes an operation button 206 to be selected when the user wants to display the icon image corresponding to a gas station, and an operation button 208 to be selected when the user wants to display the icon image corresponding to a restaurant. In this state, as the user operates the operating unit 30, places the cursor on the operation button 206, and selects the operation button 206, the control unit 102 determines that it is instructed to display the icon image corresponding to a gas station.

Figure 8:
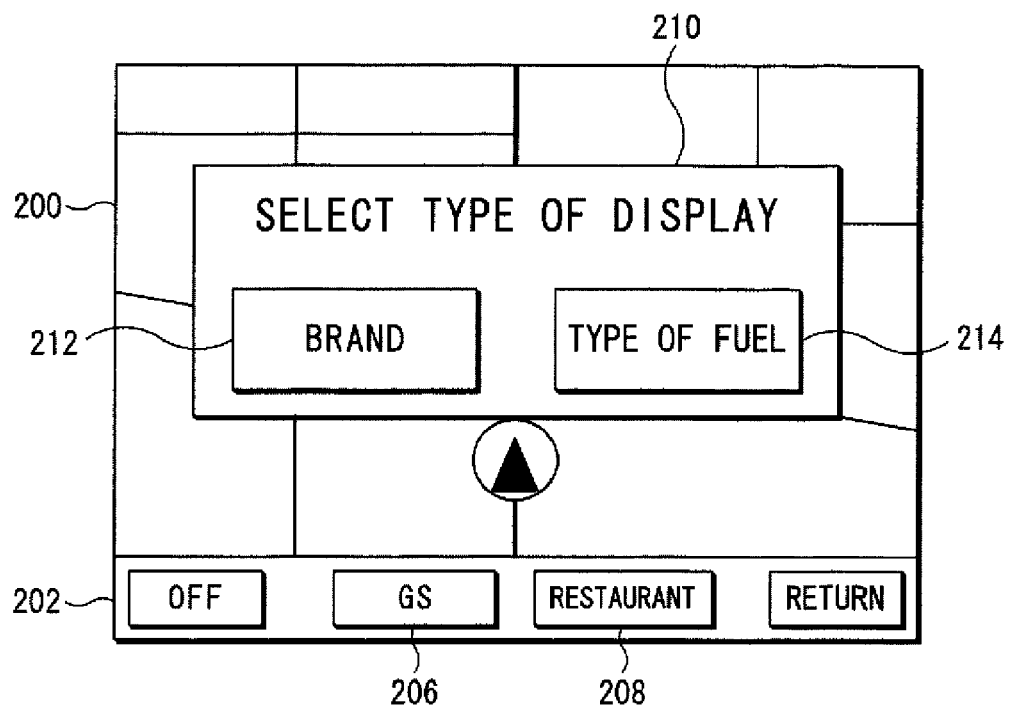
FIG. 8 illustrates a first example of a synthesized image including a type selection screen.

If it is instructed to display the icon image corresponding to a gas station, the control unit 102 instructs the operation screen/mark generator 108 to draw a screen (type selection screen) whereby the user selects the type of the icon image. The operation screen/mark generator 108 draws the type selection screen in response to this instruction. The image synthesizing unit 118 further synthesizes this type selection screen, and causes the display unit 70 to display the resultant (S103). FIG. 8 illustrates one example of the display image in the above case, which includes a type selection screen 210 as well as the map image 200 and the menu screen 202. The type selection screen 210 includes an operation button 212 to be selected when the user wants to display the icon image corresponding to a brand and an operation button 214 to be selected when the user wants to display the icon image corresponding to the type of fuel.

Next, the control unit 102 determines whether it is instructed to display the icon image corresponding to the brand (S104). In particular, in a state that the type selection screen 210 in FIG. 8 is displayed, as the user operates the operating unit 30, places the cursor on the operation button 212, and selects the operation button 212, the control unit 102 determines that it is instructed to display the icon image corresponding to the brand.

If it is instructed to display the icon image corresponding to the brand, the control unit 102 specifies, of the facility information corresponding to a predetermined range around the vehicle position and stored in the buffer memory 104, the facility information for which the category is a gas station, that is, the facility information corresponding to a gas station contained in the map image now being displayed (S105).

Next, the control unit 102 selects a brand being the attribute information in the facility information corresponding to the specified gas station, and extracts an icon ID associated with the brand concerned. Further, the control unit 102 acquires, from the facility icon information stored in the buffer memory 104, icon image data in the facility icon information including the extracted icon ID, that is, the icon image data corresponding to the brand of the gas station (S106). Thereafter, the control unit 102 associates the ID in the facility information specified at S105 with the icon image data acquired at S106, and provides the result to the map drawing unit 106. Here, in case facility information for a plurality of facilities is specified at S105, the icon ID associated with the brand in the facility information for each of the facilities is extracted; further, of the facility icon information stored in the buffer memory 104, the icon image data in the facility icon information including the extracted icon ID is acquired.

The map drawing unit 106, acquiring information (input information) wherein the ID in the facility information specified at S105 is associated with the icon image data acquired at S106 by the control unit 102, specifies the facility information having the ID in the input information, of the facility information stored in the buffer memory 104, and recognizes the position of the corresponding gas station on the basis of the node identified in the specified facility information. Further, the map drawing unit 106 draws to superimposed the icon image based on the icon image data in the input information, that is, the icon image corresponding to the brand of the gas station, at the recognized position of the gas station in the drawn map image around the vehicle position. The image synthesizing unit 118 causes the display unit 70 to display the map image with this icon image superimposed (S107).

Figure 9:
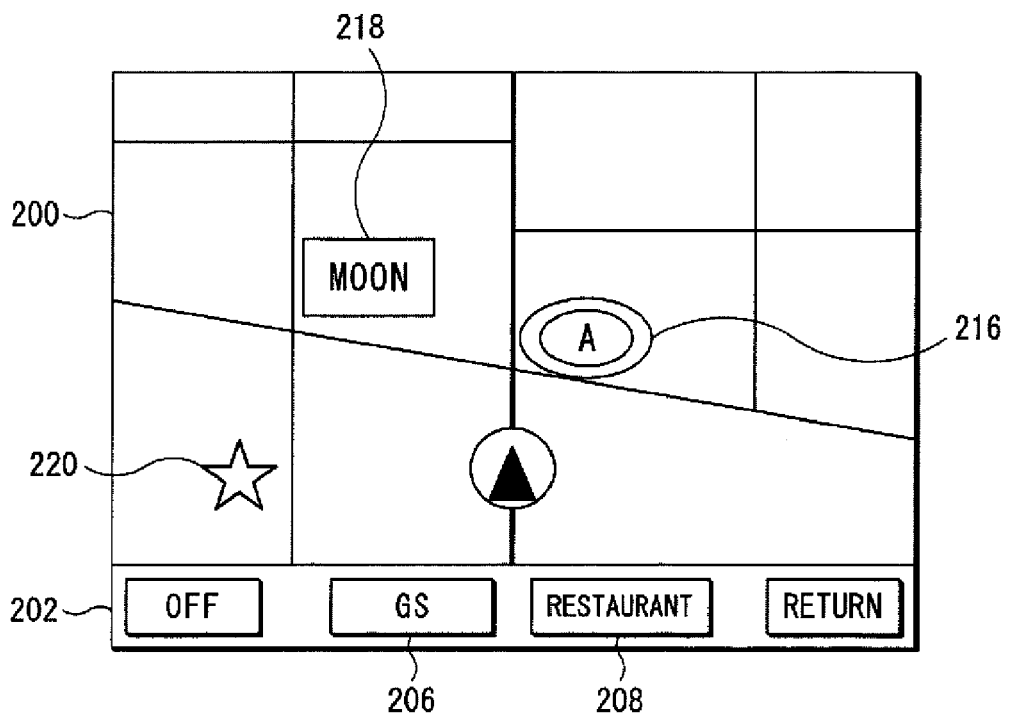
FIG. 9 illustrates a first example of a map image on which an icon image corresponding to a brand is superimposed.

FIG. 9 illustrates one example of the map image on which the icon image corresponding to the brand of the gas station is superimposed. In FIG. 9, icon images 216, 218, and 220 corresponding to the brands of the gas stations are superimposed at the positions of the gas stations in the map image 200.

Returning to FIG. 4, if the control unit 102 determines at S104 that it is not instructed to display the icon image corresponding to the brand, the control unit 102 determines whether it is instructed to display the icon image corresponding to the type of fuel (S108). In particular, in a state that the type selection screen 210 in FIG. 8 is displayed, as the user operates the operating unit 30, places the cursor on the operation button 214, and selects the operation button 214, the control unit 102 determines that it is instructed to display the icon image corresponding to the type of fuel. If it is not instructed to display the icon image corresponding to the type of fuel, the determination (S104) of whether it is instructed to display the icon image corresponding to the brand and the process thereafter is repeated.

On the other hand, if it is instructed to display the icon image corresponding to the type of fuel, the control unit 102 specifies the facility information corresponding to the gas station contained in the map image now being displayed (S109). In particular, in the same manner as S105, the control unit 102 specifies the facility information of which category is the gas station, of the facility information corresponding to a predetermined range around the vehicle position, stored in the buffer memory 104.

Next, the control unit 102 acquires the icon image data corresponding to the icon ID associated with the type of fuel in the specified facility information (S110). Specifically, in the same manner as S106, the control unit 102 selects the type of fuel being the attribute information in the facility information corresponding to the gas station specified at S109, and extracts the icon ID associated with the type of fuel concerned. Further, the control unit 102 acquires the icon image data in the facility icon information including the extracted icon ID, of the facility icon information stored in the buffer memory 104, that is, the icon image data corresponding to the type of fuel of the gas station. Thereafter, the control unit 102 associates the ID in the facility information specified at S109 with the icon image data acquired at S110, and provides the result to the map drawing unit 106. Here, in case a plurality of facility information is specified at S109, the icon ID associated with the type of fuel in the facility information concerned is extracted from each of the plurality of facility information; further, the icon image data in the facility icon information including the extracted icon ID is acquired from the facility icon information stored in the buffer memory 104.

The map drawing unit 106, acquiring the input information wherein the ID in the facility information specified at S109 is associated with the icon image data acquired at S110 by the control unit 102, specifies the facility information having the ID in the input information, of the facility information stored in the buffer memory 104, and recognizes the position of the corresponding gas station on the basis of the node identified in the specified facility information. Further, the map drawing unit 106 draws to superimpose the icon image based on the icon image data in the input information, that is, the icon image corresponding to the type of fuel of the gas station, at the recognized position of the gas station in the drawn map image around the vehicle position. The image synthesizing unit 118 causes the display unit 70 to display the map image with this icon image superimposed (S111).

Figure 10:
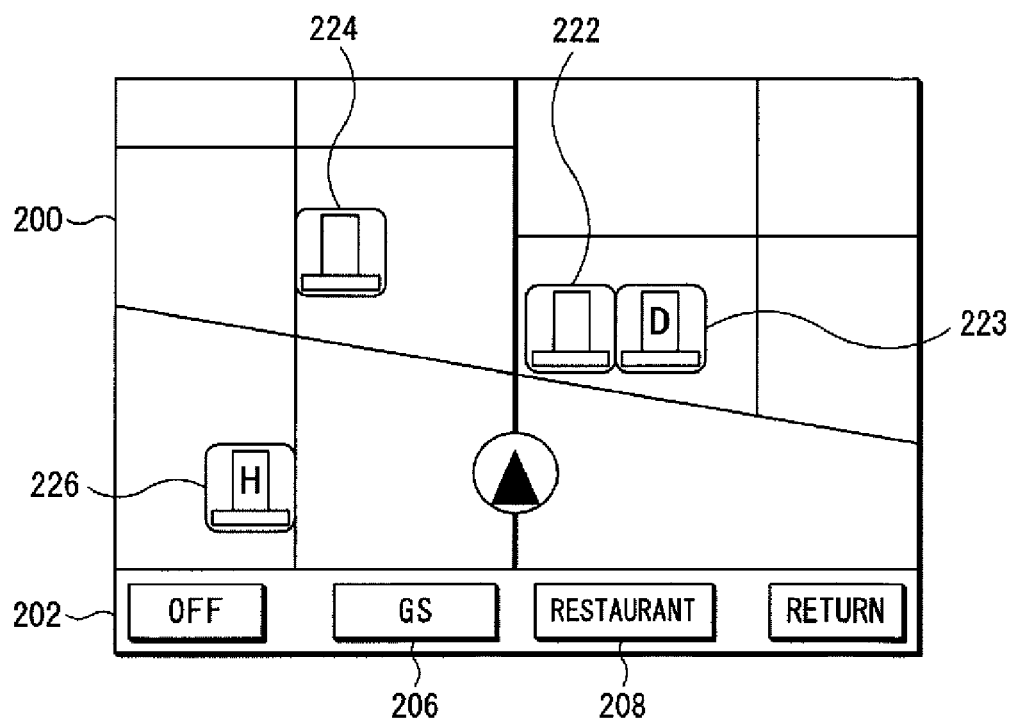
FIG. 10 illustrates one example of a map image on which icon images corresponding to fuel types are superimposed.

FIG. 10 illustrates one example of the map image on which the icon image corresponding to the type of fuel of the gas station is superimposed. In FIG. 10, icon images 222, 223, 224, and 226 corresponding to the types of fuel of the gas stations are superimposed at the positions of the gas stations in the map image 200. Of these icon images, the icon images 222 and 224 show that the corresponding gas stations provide gasoline; the icon image 223 shows that the corresponding gas station provides diesel oil; and the icon image 226 shows that the corresponding gas station provides hydrogen. Further, the icon images 222 and 223 show that one corresponding gas station provides both gasoline and diesel oil.

Returning to FIG. 4 again, if the control unit 102 determines at S102 that it is not instructed to display the icon image of the gas station, the process moves to FIG. 5, and the control unit 102 determines whether it is instructed to display the icon image corresponding to the restaurant (S201). Specifically, in FIG. 7, as the user operates the operating unit 30, places the cursor on the operation button 208, and selects the operation button 208, the control unit 102 determines that it is instructed to display the icon image corresponding to the restaurant.

Figure 11:
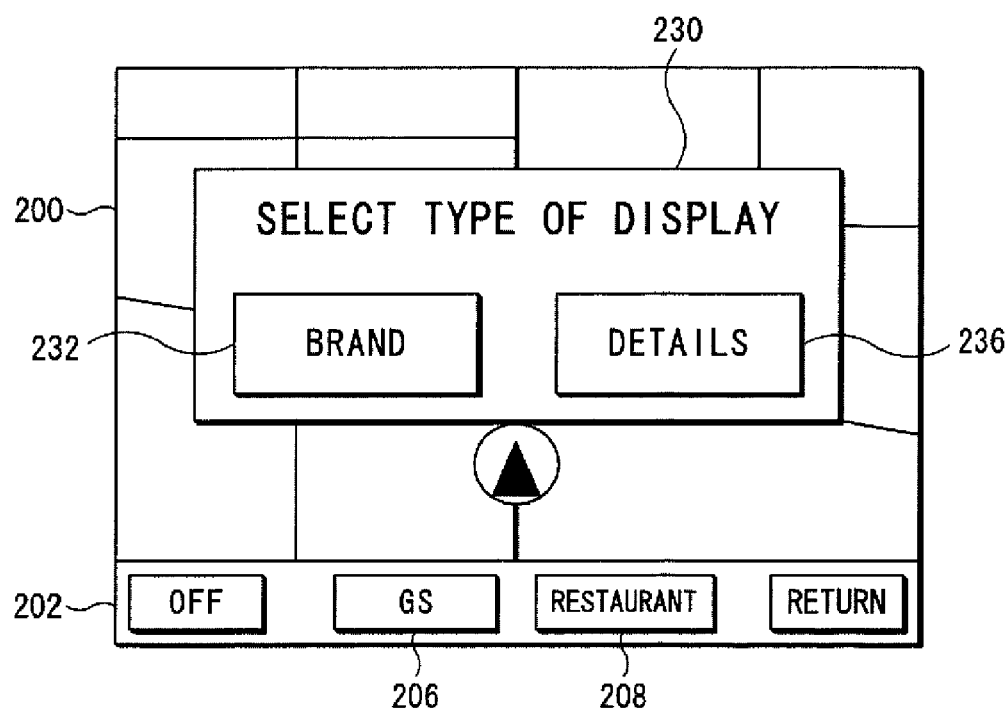
FIG. 11 illustrates a second example of a synthesized image including the type selection screen.

If it is not instructed to display the icon image corresponding to the restaurant, the determination whether it is instructed to display the icon image corresponding to the gas station (at S102 in FIG. 4) and the process thereafter are repeated. On the other hand, if it is instructed to display the icon image corresponding to the restaurant, the control unit 102 instructs the operation screen/mark generator 108 to draw the type selection screen whereby the user selects the type of the icon image. In response to this instruction, the operation screen/mark generator 108 draws the type selection screen. The image synthesizing unit 118 further synthesizes this type selection screen, and causes the display unit 70 to display the result (S202). FIG. 11 illustrates one example of the display image in this case, which includes a type selection screen 230 as well as the map image 200 and the menu screen 202. This type selection screen 230 includes an operation button 232 to be selected when the user wants to display the icon image corresponding to the brand, and an operation button 236 to be selected when the user wants to display the icon image corresponding to the available detailed information.

Next, the control unit 102 determines whether it is instructed to display the icon image corresponding to the brand (S203). Specifically, in a state that the type selection screen 230 in FIG. 11 is displayed, as the user operates the operating unit 30, places the cursor on the operation button 232, and selects the operation button 232, the control unit 102 determines that it is instructed to display the icon image corresponding to the brand.

If it is instructed to display the icon image corresponding to the brand, the control unit 102 specifies the facility information of which category is the restaurant, of the facility information corresponding to a predetermined range around the vehicle position, stored in the buffer memory 104, that is, the facility information corresponding to a restaurant contained in the map image now being displayed (S204).

Next, the control unit 102 selects a brand being the attribute information in the facility information corresponding to the specified restaurant, and extracts an icon ID associated with the brand concerned. Further, the control unit 102 acquires icon image data in the facility icon information including the extracted icon ID, of the facility icon information stored in the buffer memory 104, that is, the icon image data corresponding to the brand of the restaurant (S205). Thereafter, the control unit 102 associates the ID in the facility information specified at S204 with the icon image data acquired at S205, and provides the result to the map drawing unit 106. Here, in case a plurality of facility information is specified at S204, the icon ID added to the brand in the facility information concerned is extracted from each of the plurality of facility information; further, the icon image data in the facility icon information including the extracted icon ID is acquired, of the facility icon information stored in the buffer memory 104.

The map drawing unit 106, acquiring the input information wherein the ID in the facility information specified at S204 is associated with the icon image data acquired at S205 by the control unit 102) specifies the facility information having the ID in the input information, of the facility information stored in the buffer memory 104, and recognizes the position of the corresponding restaurant on the basis of the node identified in the specified facility information. Further, the map drawing unit 106 draws to superimpose the icon image based on the icon image data in the input information, that is, the icon image corresponding to the brand of the restaurant, at the recognized position of the restaurant in the drawn map image around the vehicle position. The image synthesizing unit 118 causes the display unit 70 to display the map image with this icon image superimposed (S206).

Figure 12:
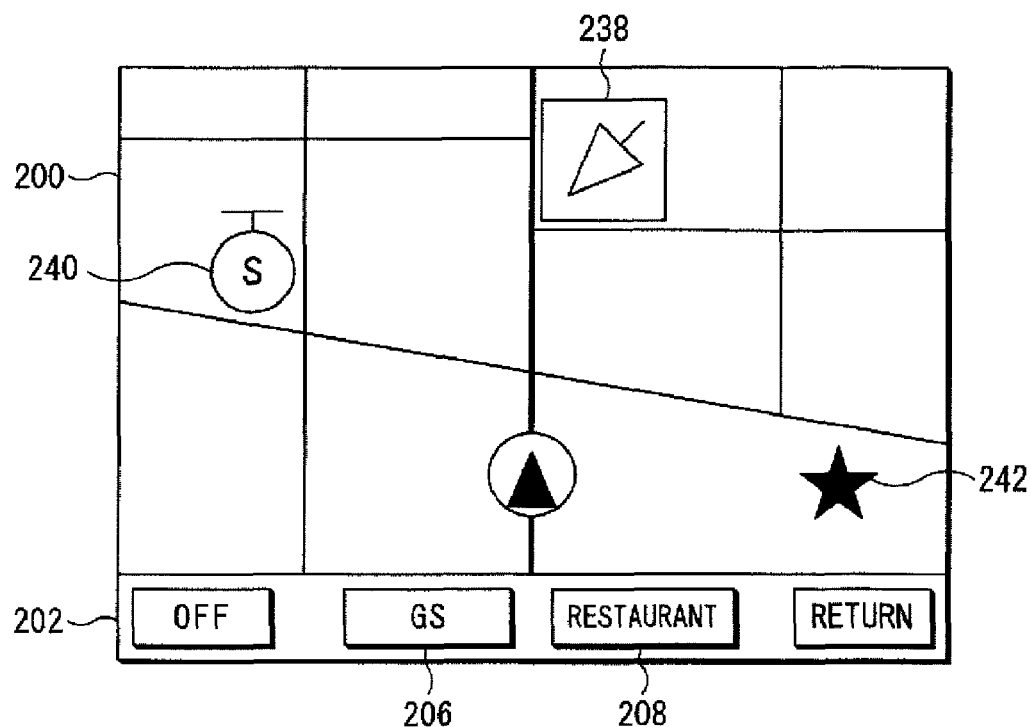
FIG. 12 illustrates a second example of a map image on which an icon image corresponding to a brand is superimposed.

FIG. 12 illustrates one example of the map image on which the icon image corresponding to the brand of the restaurant is superimposed. In FIG. 12, icon images 238, 240, and 242 corresponding to the brands of the restaurants are superimposed at the positions of the restaurants in the map image 200.

Returning to FIG. 5 again, if the control unit 102 determines at S203 that it is not instructed to display the icon image corresponding to the brand, the control unit 102 determines whether it is instructed to display the icon image corresponding to the available detailed information (S207). Specifically, in a state that the type selection screen 210 in FIG. 11 is displayed, as the user operates the operating unit 30, places the cursor on the operation button 226, and selects the operation button 236, the control unit 102 determines that it is instructed to display the icon image corresponding to the available detailed information. If it is not instructed to display the icon image corresponding to the available detailed information, the determination (S203) whether it is instructed to display the icon image corresponding to the brand and the process thereafter are repeated.

On the other hand, if it is instructed to display the icon image corresponding to the available detailed information, the control unit 102 specifies the facility information corresponding to the restaurant contained in the map image now being displayed (S208). Specifically) in the same manner as S204, the control unit 102 specifies the facility information of which category is the restaurant, of the facility information corresponding to a predetermined range around the vehicle position, stored in the buffer memory 104.

In case there is the available detailed information in the specified facility information, the control unit 102 acquires the icon image data corresponding to the icon ID associated with the available detailed information (S209). Specifically, in the same manner as S205, the control unit 102 selects the available detailed information being the attribute information in the facility information corresponding to the restaurant specified at S208, and extracts the icon ID associated with the available detailed information concerned. Further, the control unit 102 acquires the icon image data in the facility icon information including the extracted icon ID, of the facility icon information stored in the buffer memory 104, that is, the icon image data corresponding to the available detailed information of the restaurant. Thereafter, the control unit 102 associates the ID in the facility information specified at S208 with the icon image data acquired at S209, and provides the result to the map drawing unit 106. Here, in case a plurality of facility information is specified at S208, the icon ID associated with the available detailed information in the facility information concerned is extracted from each of the plurality of facility information; further, the icon image data in the facility icon information including the extracted icon ID is acquired from the facility icon information stored in the buffer memory 104.

The map drawing unit 106, acquiring the input information wherein the ID in the facility information specified at S208 is associated with the icon image data acquired at S209 by the control unit 102, specifies the facility information having the ID in the input information, of the facility information stored in the buffer memory 104, and recognizes the position of the corresponding restaurant on the basis of the node identified in the specified facility information. Further, the map drawing unit 106 draws to superimpose the icon image based on the icon image data in the input information, that is, the icon image corresponding to the available detailed information of the restaurant, at the recognized position of the restaurant in the drawn map image around the vehicle position. The image synthesizing unit 118 causes the display unit 70 to display the map image with this icon image superimposed (S210).

Figure 13:
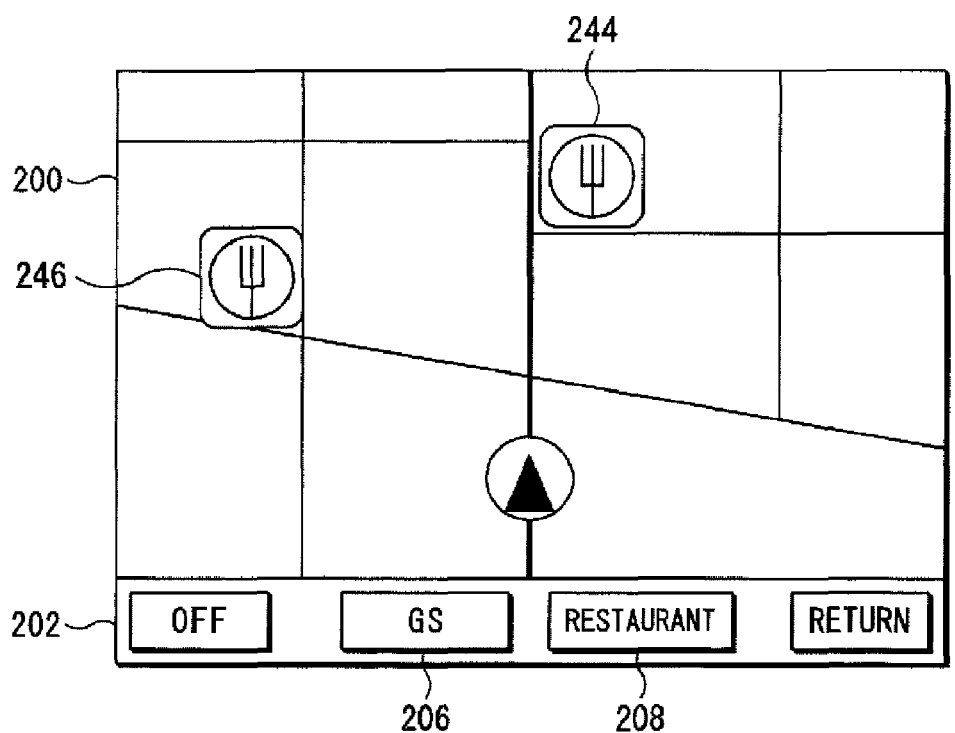
FIG. 13 illustrates one example of a map image on which icon images corresponding to available detailed information are superimposed.

FIG. 13 illustrates one example of the map image on which the icon image corresponding to the available detailed information of the restaurant is superimposed. In FIG. 13, icon images 244 and 246 corresponding to the available detailed information of the restaurants are superimposed at the positions of the restaurants for which detailed information can be provided, in the map image 200. The icon images 244 and 246 show that the navigation device 100 can provide detailed information on evaluations and so forth of the corresponding restaurants.

Figure 14:
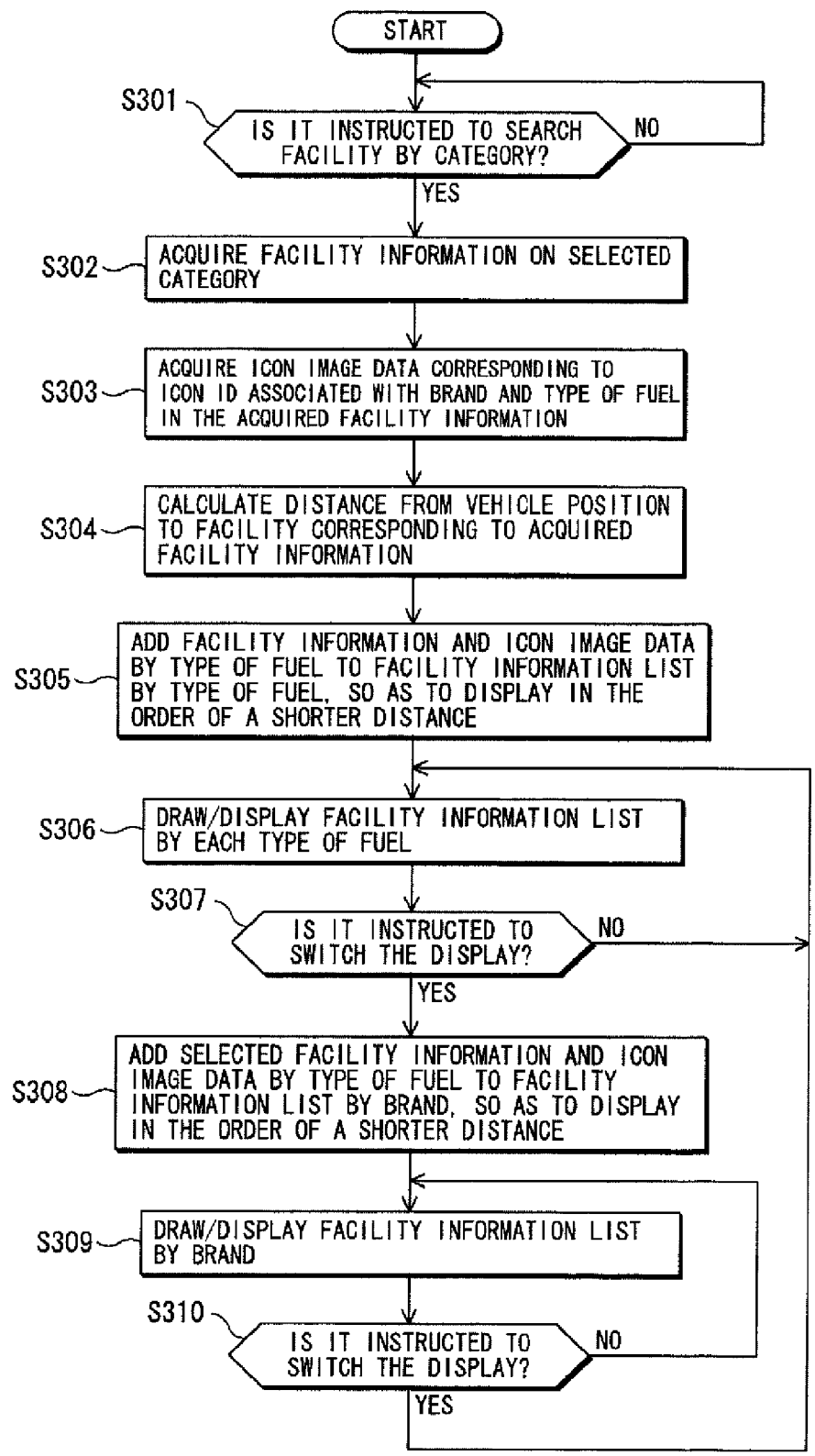
FIG. 14 is a flow chart illustrating a facility search operation.

Next, the searching of a facility in the navigation device 100 will be described in detail. FIG. 14 is a flow chart illustrating the operation of searching for a facility.

Figure 15:
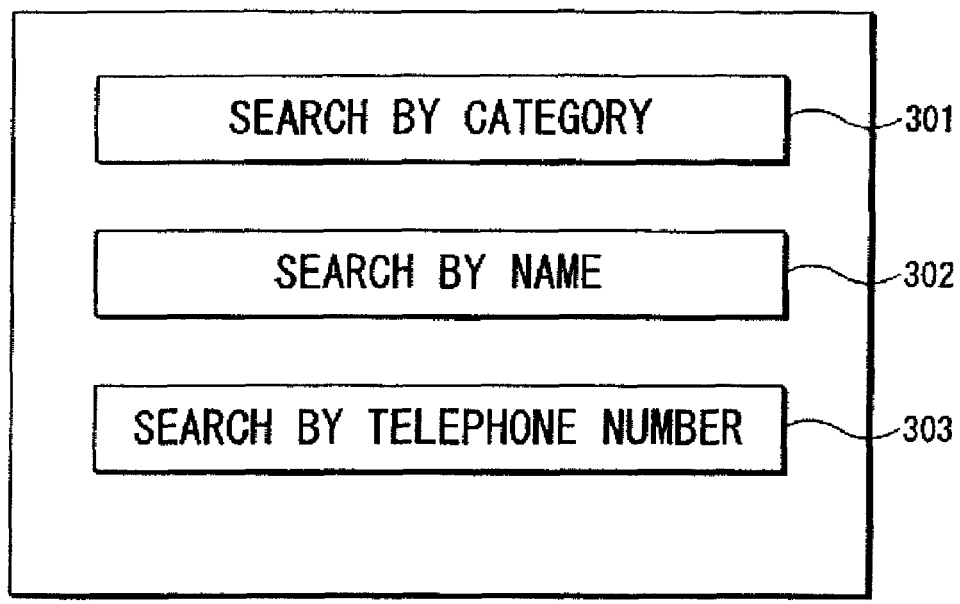
FIG. 15 illustrates one example of a search method selection screen.

The control unit 102 determines whether the user operates the operating unit 30 and instructs the search of a facility by category (S301). Specifically, if it is determined that the user operates the operating unit 30 and instructs the search of a facility, the control unit 102 instructs the operation screen/mark generator 108 to draw a search method selection screen whereby the user selects a method of searching for a facility. The operation screen/mark generator 108 draws the search method selection screen in response to this instruction. The image synthesizing unit 118 causes the display unit 70 to display the search method selection screen. FIG. 15 illustrates one example of the search method selection screen, which includes an operation button 301 for selecting the searching of a facility by category, an operation button 302 for selecting the searching of a facility based on a name, and an operation button 303 for selecting the searching of a facility based on a telephone number. In a state that the search method selection screen is displayed, as the user operates the operating unit 30, places the cursor on the operation button 301, and selects the operation button 301 concerned, the control unit 102 determines that the searching of a facility by category has been instructed.

Figure 16:
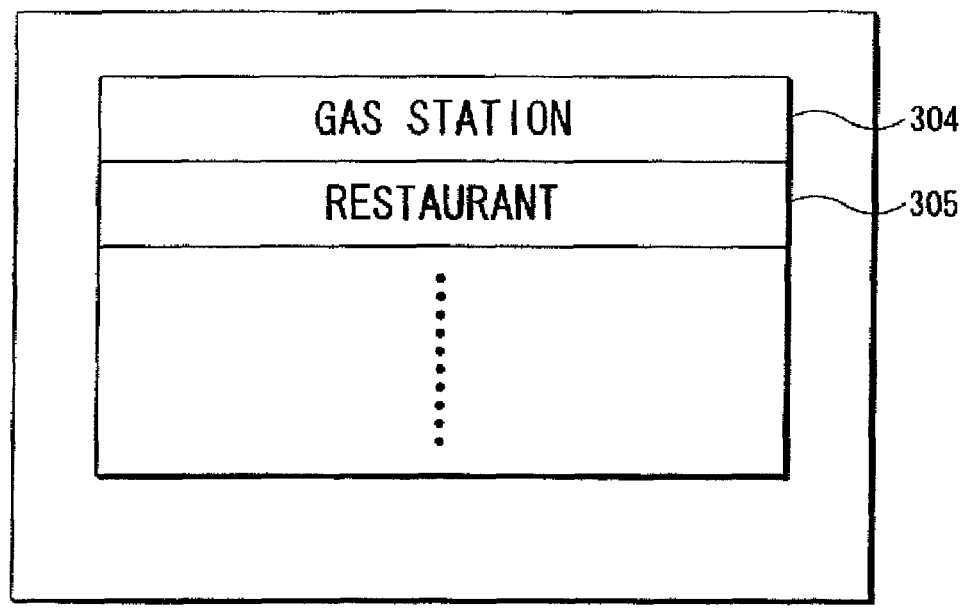
FIG. 16 illustrates one example of a category selection screen.

If it is instructed to search a facility by category, the control unit 102 specifies a category selected by the user's operation of the operating unit 30. In particular, as the user selects the operation button 301, the control unit 102 instructs the operation screen/mark generator 108 to display a category selection screen whereby the user selects the category. The operation screen/mark generator 108 draws the category selection screen in response to this instruction. The image synthesizing unit 118 causes the display unit 70 to display the category selection screen. FIG. 16 illustrates one example of the category selection screen, which includes an operation button 304 for selecting a gas station as the category and an operation button 305 for selecting a restaurant. In a state that the category selection screen is displayed, as the user operates the operating unit 30, places the cursor on the operation button 304 or 305, and selects either button, the control unit 102 specifies the category corresponding to the selected operation button 304 or 305. Further, the control unit 102 acquires the facility information including the specified category, of the facility information corresponding to a predetermined range around the vehicle position, stored in the buffer memory 104 (S302). In the following description, it is assumed that the gas station is selected as the category by the user's operation of the operating unit 30, and the facility information of which category is the gas station is acquired.

Next, the control unit 102 selects a brand and a type of fuel as the attribute information in the facility information corresponding to the gas station acquired from the buffer memory 104, and extracts an icon ID associated with each of the brand and the type of fuel. Further, the control unit 102 acquires an icon image data in the facility icon information including the extracted icon ID of the facility icon information stored in the buffer memory 104, that is, an icon image data corresponding to the brand of the gas station, and an icon image data corresponding to the type of fuel (S303). Here, in case a plurality of facility information is acquired at S302, the icon ID associated with each of the brand and the type of fuel in the facility information concerned is extracted from each of the plurality of facility information; further, the icon image data in the facility icon information including the extracted icon ID is acquired, of the facility icon information stored in the buffer memory 104.

Figure 17:
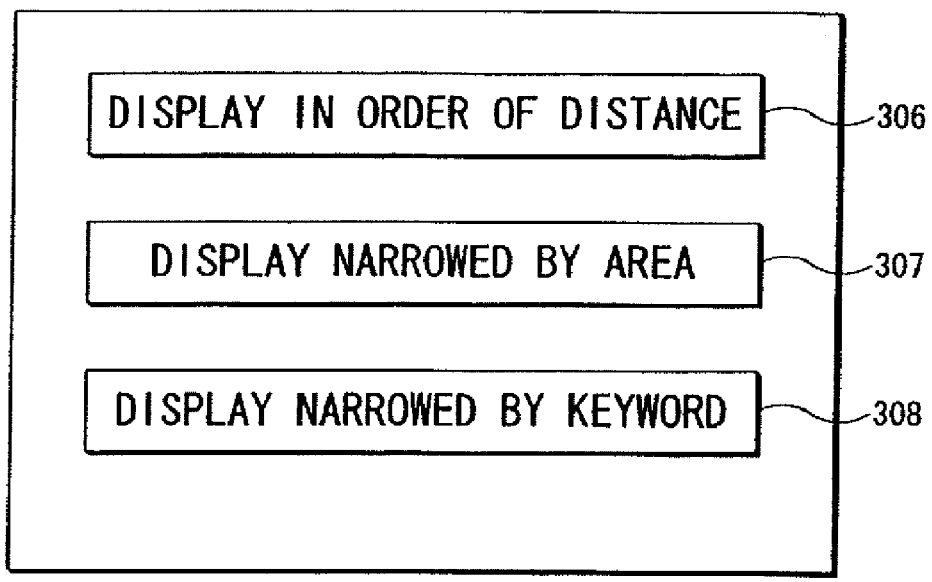
FIG. 17 illustrates one example of a display method selection screen.

Next, the control unit 102 calculates a distance between the vehicle position and each of the facilities corresponding to the facility information acquired at S302 (S304). Specifically, in FIG. 16, as the user operates the operating unit 30, places the cursor on the operation button 304, and selects it, the control unit 102 instructs the operation screen/mark generator 108 to display a display method selection screen whereby the user selects the display method of the search result. The operation screen/mark generator 108 draws the display method selection screen in response to this instruction. The image synthesizing unit 118 causes the display unit 70 to display the display method selection screen. FIG. 17 illustrates one example of the display method selection screen, which includes an operation button 306 for selecting the display in the order of distance, an operation button 307 for selecting the display narrowed by area, and an operation button 308 for selecting the display narrowed by keyword.

In a state that the display method selection screen is displayed, as the user operates the operating unit 30, places the cursor on any of the operation buttons 306 through 308, and selects any one, the control unit 102 specifies the display method corresponding to one of the selected operation buttons 306 through 308. In the following description, it is assumed that the display in order of distance is selected by the user's operation of the operating unit 30.

If the display in order of distance is selected, the control unit 102 calculates a distance from a vehicle position to a facility corresponding to the facility information, on the basis of the GPS signal received by the GPS receiver 50, the travel direction of a vehicle detected by the dead reckoning sensor 60, the position (latitude, longitude) of the vehicle detected by the output interval of the speed pulses, and the node in the facility information acquired from the buffer memory 104. Further, the control unit 102 adds the calculated distance to the corresponding facility information.

Next, the control unit 102 adds each of the facility information in the search result to the facility information by each type of fuel in a list, in a manner that the facility information acquired at S302 is associated with the icon image data acquired at S303 corresponding to each type of fuel in the facility icon information including the icon ID associated with each type of fuel in the facility information concerned. In this case, the control unit 102 adds the facility information and the icon image data corresponding to each type of fuel to the facility information list by each type of fuel, so as to rank in a higher position the one having a shorter distance between the facility corresponding to the facility information concerned and the vehicle position, that is, to display in the order of a shorter distance between the corresponding facility and the vehicle position (S305). The facility information list by each type of fuel thus made is provided to the facility list drawing unit 116. The facility list drawing unit 116 draws an image of the facility information list by each type of fuel including the facility name and the icon image corresponding to each type of fuel, on the basis of the received facility information list by each type of fuel. The image synthesizing unit 118 causes the display unit 70 to display the image of the facility information list by each type of fuel (S306).

Figure 18:
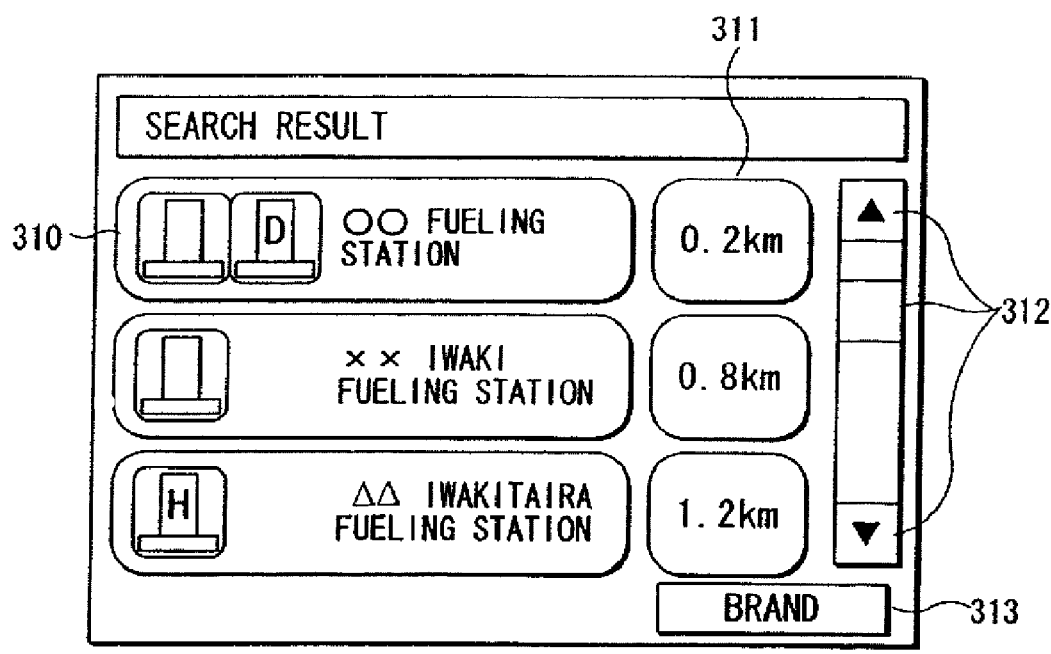
FIG. 18 illustrates one example of an image of a display of a fuel type/facility information list.

FIG. 18 illustrates one example of the image of the facility information list by each type of fuel. The image of the facility information list by each type of fuel illustrated in FIG. 18 includes an icon image and name 310 of the facility, a distance 311 from the vehicle position to the facility, a scroll button 312, and an operation button 313 for switching the display. The icon image and name 310 of the facility is acquired from the name in the facility information and the icon image data corresponding to each type of fuel associated with the facility information. The distance 311 is acquired from the distance associated with the facility information.

Returning to FIG. 14, after the image of the facility information list by each type of fuel is displayed, the control unit 102 determines whether the user operates the operating unit 30 and instructs to switch the display (S307). Specifically, in FIG. 18, as the user operates the operating unit 30, places the cursor on the operation button 313, and selects the operation button 313, the control unit 102 determines that it is instructed to switch the display.

If it is not instructed to switch the display, the image of the facility information list by each type of fuel is continued. On the other hand, if it is instructed to switch the display, the control unit 102 adds each of the facility information in the search result to a brand facility information in a list, in a manner that the facility information acquired at S302 is associated with the icon image data acquired at S303 corresponding to the brand in the facility icon information including the icon ID associated with the brand in the facility information. In this case, the control unit 102 adds the facility information and the icon image data corresponding to the brand to the brand facility information list, so as to display in the order of a shorter distance between the facility corresponding to the facility information concerned and the vehicle position (S308). The information of the brand facility information list thus made is provided to the facility list drawing unit 116. The facility list drawing unit 116 draws an image of the brand facility information list including the facility name and the icon image corresponding to the brand, on the basis of the information of the received brand facility information list. The image synthesizing unit 118 causes the display unit 70 to display the image of the brand facility information list (S309).

Figure 19:
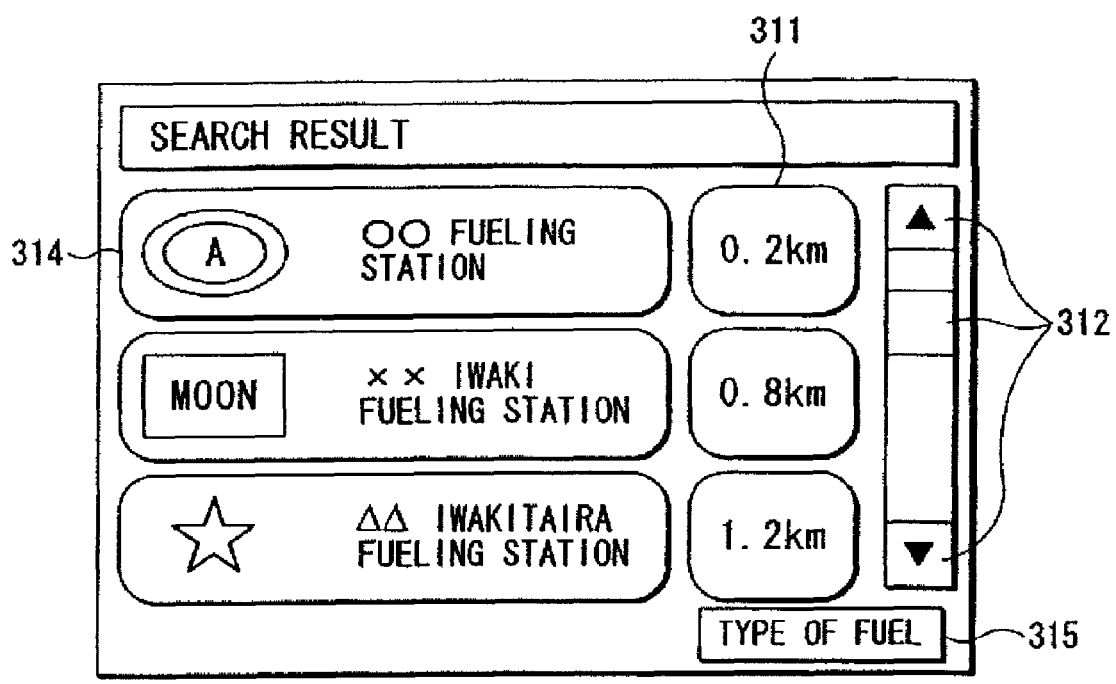
FIG. 19 illustrates one example of an image of a display of a brand/facility information list.

FIG. 19 illustrates one example of the image of the brand facility information list. The image of the brand facility information list illustrated in FIG. 19 includes an icon image and name 314 of the facility, the distance 311 from the vehicle position to the facility, a scroll button 312, and an operation button 315 for switching the display. The icon image and name 314 of the facility is acquired from the name in the facility information and the icon image data corresponding to the brand, associated with the facility information.

Returning to FIG. 14 again, after the image of the brand facility information list is displayed, the control unit 102 determines whether the user operates the operating unit 30 and instructs to switch the display (S310). Specifically, in FIG. 19, as the user operates the operating unit 30, places the cursor on the operation button 315, and selects the operation button 315, the control unit 102 determines that it is instructed to switch the display. If it is not instructed to switch the display, the image of the brand facility information list is continued. On the other hand, if it is instructed, the image of the brand facility information list is again drawn and displayed (S306). The processes of S306 through S310 are continued until the user operates the operating unit 30, selects any of the facility names contained in the image of the facility information list by each type of fuel and the image of the brand facility information list, and determines the facility as a destination, for example.

Thus, the navigation device 100 of this embodiment provides the icon image corresponding to each of a plurality of attributes of the facilities, and draws for display any of the icon images corresponding to the plurality of attributes of the facilities included in the facility information, at a position in the map image corresponding to the node included in the facility information. Therefore, the user can recognize various types of information about the corresponding facility from the various types of icon images displayed, since various types of icon images corresponding to the plurality of attributes of the facilities can selectively be drawn on the map image to be superimposed thereon.

Further, in the navigation device 100 of this embodiment, since the icon image corresponding to the attribute of the facility is selectively included in the image of the result of searching for a facility, the user can recognize various types of information about the corresponding facility by the icon image.

Further, in the above embodiment, the attribute of the facility is selected in response to the user's instruction, and the icon image corresponding to the attribute concerned is displayed to be superimposed on the map image. However, the attribute of the facility may be selected in response to the operation state of the navigation device 100, and the icon image corresponding to the attribute concerned may be displayed to be superimposed on the map image. During route guidance, for example, the control unit 102 selects a brand as the attribute information in the facility information corresponding to a predetermined range around the vehicle position stored in the buffer memory 104, and extracts the icon ID associated with the brand concerned. Further, the control unit 102 acquires the icon image data in the facility icon information including the extracted icon ID, of the facility icon information stored in the buffer memory 104. The control unit 102 associates the specified ID in the facility information with the acquired icon image data, and provides the result to the map drawing unit 106. The map drawing unit 106, acquiring the input information wherein the ID in the facility information is associated with the icon image data, specifies the facility information having the ID in the input information, of the facility information stored in the buffer memory 104, and recognizes the position of the corresponding facility on the basis of the node identified in the specified facility information. Further, the map drawing unit 106 draws to superimpose the icon image based on the icon image data in the input information, that is, the icon image corresponding to the brand, at the recognized position of the facility in the map image. The image synthesizing unit 118 causes the display unit 70 to display the map image with this icon image superimposed. Thereby, the icon image corresponding to the brand is displayed during route guidance, and the user can easily recognize a landmark facility in making a right or left turn and the like.

In the above embodiment, the facility information list by each type of fuel is displayed preferentially to the brand facility information list, from a view point that many users want to know the types of fuel provided by the facility during a facility search. However, the brand facility information list may be displayed preferentially instead.

As described above, the navigation device and the facility image display method of the invention enable the user to recognize various types of information about a facility from the image corresponding to the facility, and are useful as a navigation device and a facility image display method.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

The invention claimed is:

1. A navigation device comprising:
    a map drawing information storage means that stores map drawing information used for drawing a map image;
    a facility information storage means that stores facility information including positional information on facilities and attributes of the facilities;
    a facility image storage means that stores different facility images corresponding to each of a plurality of attributes of a facility;
    a first attribute selection means that selects one of the attributes of the facilities included in the facility information stored in the facility information storage means in accordance with a user's operation of an operating unit in selecting the facility attribute:
    a map drawing means that draws the map image based on the map drawing information, and selectively draws one of the facility images corresponding to one of the plurality of attributes of an individual facility included in the facility information, at a position corresponding to the positional information of the facility included in the facility information in the map image, wherein the map drawing means draws a facility image corresponding to a facility attribute selected by the first attribute selection means, of the facility images stored in the facility image storage means; and
    a first display control means that causes a display means to display images drawn by the map drawing means.

2. The navigation device according to Claim 1, wherein:
    the facility is a gas station; and
    the attributes include a brand of the gas station and a type of fuel provided by the gas station.

3. The navigation device according to claim 2, wherein the first attribute selection means selects the facility attribute in accordance with an operational state of the navigation device.

4. The navigation device according to claim 1, comprising:
a facility information search means that searches the facility information stored in the facility information storage means in accordance with a user's operation of an operating unit in searching for a facility;
a search result drawing means that draws a search result image including an image corresponding to the facility information acquired as a search result by the facility information search means, and any of the facility images corresponding to the attributes of the facilities included in the facility information acquired as the search result by the facility information search means; and
a second display control means that causes the display means to display the search result image drawn by the search result drawing means.

5. The navigation device according to claim 4, comprising a second attribute selection means that selects one of the attributes of the facilities included in the facility information acquired as the search result by the facility information search means,
wherein the search result drawing means draws a facility image corresponding to a facility attribute selected by the second attribute selection means, of the facility images corresponding to the attributes of the facilities included in the facility information acquired as the search result by the facility information search means.

6. The navigation device according to claim 5, wherein the second attribute selection means selects one of the attributes of the facilities in accordance with a user's operation of an operating unit in selecting the facility attribute.

7. The navigation device according to claim 6, wherein:
the facility is a gas station; and
the attributes include a brand of the gas station and a type of fuel provided by the gas station.

8. The navigation device according to claim 4, comprising:
a positional detection means that detects a position of the navigation device; and
a distance calculation means that calculates a distance between a facility corresponding to the facility information acquired as the search result by the facility information search means and the navigation device, on the basis of positional information included in the facility information acquired as the search result by the facility information search means and a position of the navigation device detected by the positional detection means,
wherein the search result drawing means draws an image, in a manner that the facility information acquired as the search result by the facility information search means are arranged in order of distance between the facility corresponding to the facility information and the navigation device.

9. The navigation device according to claim 1, wherein the attribute of the facility includes at least one of names of facilities, types of goods or services provided by the facilities, and information indicating that the navigation device can provide information about the facilities.

10. A facility image display method comprising:
drawing a map image based on map drawing information stored in a storage means;
selecting one of a plurality of attributes of a facility included in facility information stored in the storage means in accordance with a user's operation of an operating unit in selecting the facility attribute;
selectively drawing one of a plurality of different facility images corresponding to the selected attribute of an individual facility included in facility information stored in the storage means, at a position in the map image corresponding to positional information of the facility included in the facility information; and
displaying, on a display means, the map image and the facility image corresponding to the selected attribute of the facility.

11. The facility image display method according to claim 10, further comprising:
searching the facility information stored in the storage means in accordance with a user's operation of an operating unit in searching for a facility;
drawing a search result image including an image corresponding to the facility information acquired as a search result and one of the facility images corresponding to the attributes of the facilities included in the facility information acquired as the search result; and
causing the display means to display the drawn search result image.

* * * * *